(No Model.)

S. B. MINNICH.
MANURE HOOK.

No. 254,147. Patented Feb. 28, 1882.

Witnesses
Alexander Clavius
[signature]

Inventor
Simon B. Minnich
per Wm. R. Gerhart
His Attorney

UNITED STATES PATENT OFFICE.

SIMON B. MINNICH, OF LANDISVILLE, PENNSYLVANIA.

MANURE-HOOK.

SPECIFICATION forming part of Letters Patent No. 254,147, dated February 28, 1882.

Application filed October 28, 1881. (No model.)

*To all whom it may concern:*

Be it known that I, SIMON B. MINNICH, a citizen of the United States, residing at Landisville, in the county of Lancaster and State of Pennsylvania, have invented certain Improvements in Manure-Hooks, of which the following is a specification.

My invention relates to improvements in manure-hooks in which the tines of the hook are thrown into a horizontal position in order to free them from their load; and the objects of my improvements are, first, the manner of holding the hook in position when loaded and of throwing it into a horizontal position in order to free it from said load; second, an arrangement of the tines by which the load is more securely held; and, third, to control and guide the hook more easily. I attain these objects by the mechanism illustrated in the accompanying drawings, in which—

Figure 1:
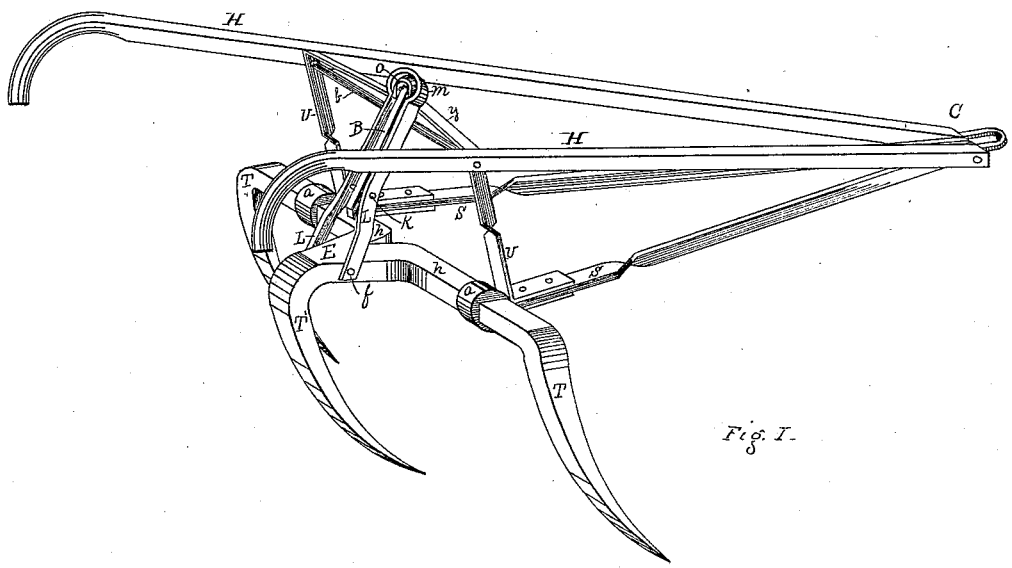
Figure 2:
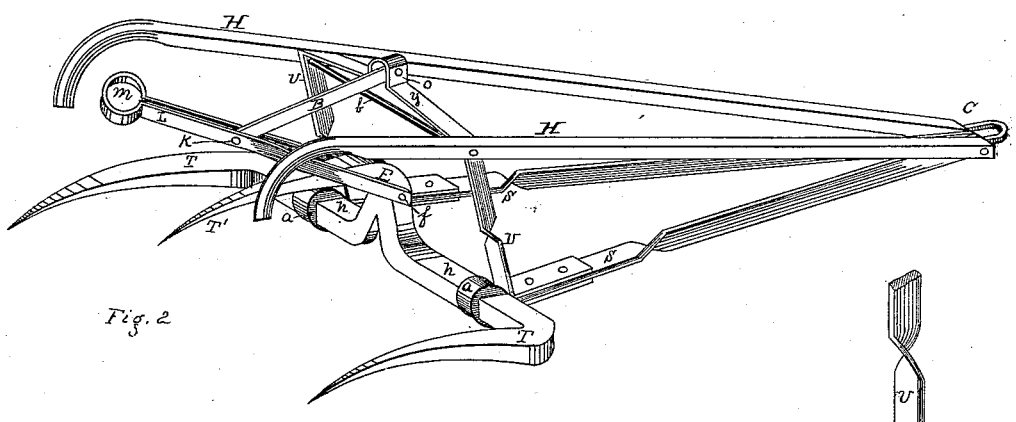
Figure 3:
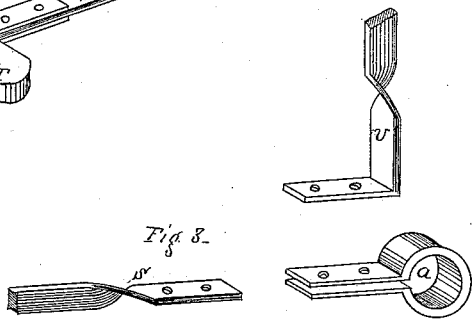

Figure 1 is a perspective view of the hook with the tines set for taking up and carrying a load; Fig. 2, a perspective view of the same with the tines in a horizontal position, and Fig. 3 a view of the bearings connecting the bar of the hook with the frame of the same.

Similar letters refer to similar parts throughout the several views.

The hook $h$ has three tines, the center one of which, T', is set back of the other two, T T, by means of an elbow, E. The faces of the three thus form a concave front, enabling the hook to take up a greater load and to hold it more securely than if the tines were otherwise arranged. If desirable, the number of tines may be increased, those in the center having elbows similar to that of T', and of such length that the faces of the tines shall present a concave front. The hook is connected with the side pieces, S, and uprights U, which support the handles H by means of the bearings $a$, the side pieces and handles being directly connected at C by a bolt, to which is fastened a ring, by which the power is attached. The handles are secured above the hook with a brace, $b$, and bar $y$, in the center of which latter is a yoke, O.

Attached to the elbow E by the bolt $f$ is a double lever-bar, L, having the handle $m$, the upper end of which rests against the bar $y$ when the hook is set for taking up and carrying a load.

Fastened in the yoke O by means of a bolt is a brace piece or link, B, having its lower end connected with the lever L by the bolt K. The lever is so shaped that when the hook is taking or carrying a load the point of connection between it and the link is below a line drawn between the bolts at $f$ and O, thus preventing the hook from revolving backward.

When the hook is to be freed from the load the connecting-point at K is drawn above the line before mentioned between the bolts at $f$ and O by pulling the handle $m$ of the lever outward and upward. The load then forces the hook into a horizontal position, when it is cleared from the same.

When the tines are in a horizontal position the points thereof are prevented from being thrown upward by means of the lever L and link B.

The handles H are of such length as to allow the hook to be conveniently managed.

What I claim as my invention, and desire to secure by Letters Patent, is—

1. A lever, L, attached to the elbow E, in combination with the link B and bar $y$, having the yoke O, whereby when the tines are in a horizontal position the ends thereof are prevented from being thrown upward, substantially as set forth.

2. A hook having a tine or tines, T', set back of those, T, at the ends of the hook $h$ by means of an elbow or elbows, E, in combination with the bearings $a$ and lever L, substantially as and for the purpose specified.

3. The handles H, connected by a bar, $y$, having a yoke, O, in the middle thereof, combined with the link B, lever L, and uprights U, as herein specified.

SIMON B. MINNICH.

Witnesses:
  GEO. A. LANE,
  WM. R. GERHART.